(12) United States Patent
Hamburg et al.

(10) Patent No.: US 12,231,562 B2
(45) Date of Patent: Feb. 18, 2025

(54) SYSTEM AND METHOD TO OPTIMIZE DECRYPTION OPERATIONS IN CRYPTOGRAPHIC APPLICATIONS

(71) Applicant: Cryptography Research, Inc., San Jose, CA (US)

(72) Inventors: Michael Alexander Hamburg, San Francisco, CA (US); Michael Tunstall, Walnut Creek, CA (US); Denis Alexandrovich Pochuev, Lafayette, CA (US)

(73) Assignee: Cryptography Research, Inc., San Jose, CA (US)

( * ) Notice: Subject to any disclaimer, the term of this patent is extended or adjusted under 35 U.S.C. 154(b) by 486 days.

(21) Appl. No.: 17/447,129

(22) Filed: Sep. 8, 2021

(65) Prior Publication Data

US 2022/0085999 A1    Mar. 17, 2022

Related U.S. Application Data

(60) Provisional application No. 63/198,967, filed on Nov. 25, 2020, provisional application No. 62/706,828, filed on Sep. 11, 2020.

(51) Int. Cl.
*H04L 9/30* (2006.01)

(52) U.S. Cl.
CPC .................... *H04L 9/3033* (2013.01)

(58) Field of Classification Search
CPC .................................... H04L 9/3033
See application file for complete search history.

(56) References Cited

U.S. PATENT DOCUMENTS

| | | | | |
|---|---|---|---|---|
| 7,050,579 B1 * | 5/2006 | Koc | .................. | G06F 7/721 |
| | | | | 708/135 |
| 8,280,041 B2 * | 10/2012 | Douguet | ............. | G06F 7/723 |
| | | | | 708/492 |
| 2002/0064278 A1 * | 5/2002 | Lim | .................. | H04L 9/302 |
| | | | | 380/30 |
| 2005/0084098 A1 * | 4/2005 | Brickell | ............ | G06F 7/723 |
| | | | | 380/28 |
| 2005/0152539 A1 * | 7/2005 | Brickell | ............ | G06F 7/723 |
| | | | | 380/28 |
| 2005/0220299 A1 * | 10/2005 | Lipson | .............. | H04L 9/302 |
| | | | | 380/30 |
| 2008/0019508 A1 * | 1/2008 | Lipson | .............. | H04L 9/302 |
| | | | | 380/30 |
| 2008/0144811 A1 * | 6/2008 | Gopal | ............... | G06F 7/723 |
| | | | | 380/30 |
| 2016/0248585 A1 * | 8/2016 | Yajima | .............. | H04L 9/3066 |

* cited by examiner

*Primary Examiner* — Saleh Najjar
*Assistant Examiner* — Devin E Almeida
(74) *Attorney, Agent, or Firm* — Lowenstein Sandler LLP

(57) ABSTRACT

Aspects of the present disclosure involve a method, a system and a computer readable memory to optimize performance of cryptographic operations by avoiding computations of inverse values during decryption of encrypted messages.

17 Claims, 7 Drawing Sheets

SYSTEM AND METHOD TO OPTIMIZE DECRYPTION OPERATIONS IN CRYPTOGRAPHIC APPLICATIONS

RELATED APPLICATIONS

This application claims the benefit of U.S. Provisional Application No. 63/198,967, filed Nov. 25, 2020, and U.S. Provisional Application No. 62/706,826 filed on Sep. 11, 2020, the entire contents of which are incorporated herein by reference.

TECHNICAL FIELD

The disclosure pertains to cryptographic computing applications, more specifically to improving efficiency of cryptographic operations.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to improving efficiency and security of cryptographic operations. More specifically, aspects of the present disclosure are directed to optimization of processor and memory utilization and to improving protection of cryptographic computations against power analysis attacks.

Figure 1:
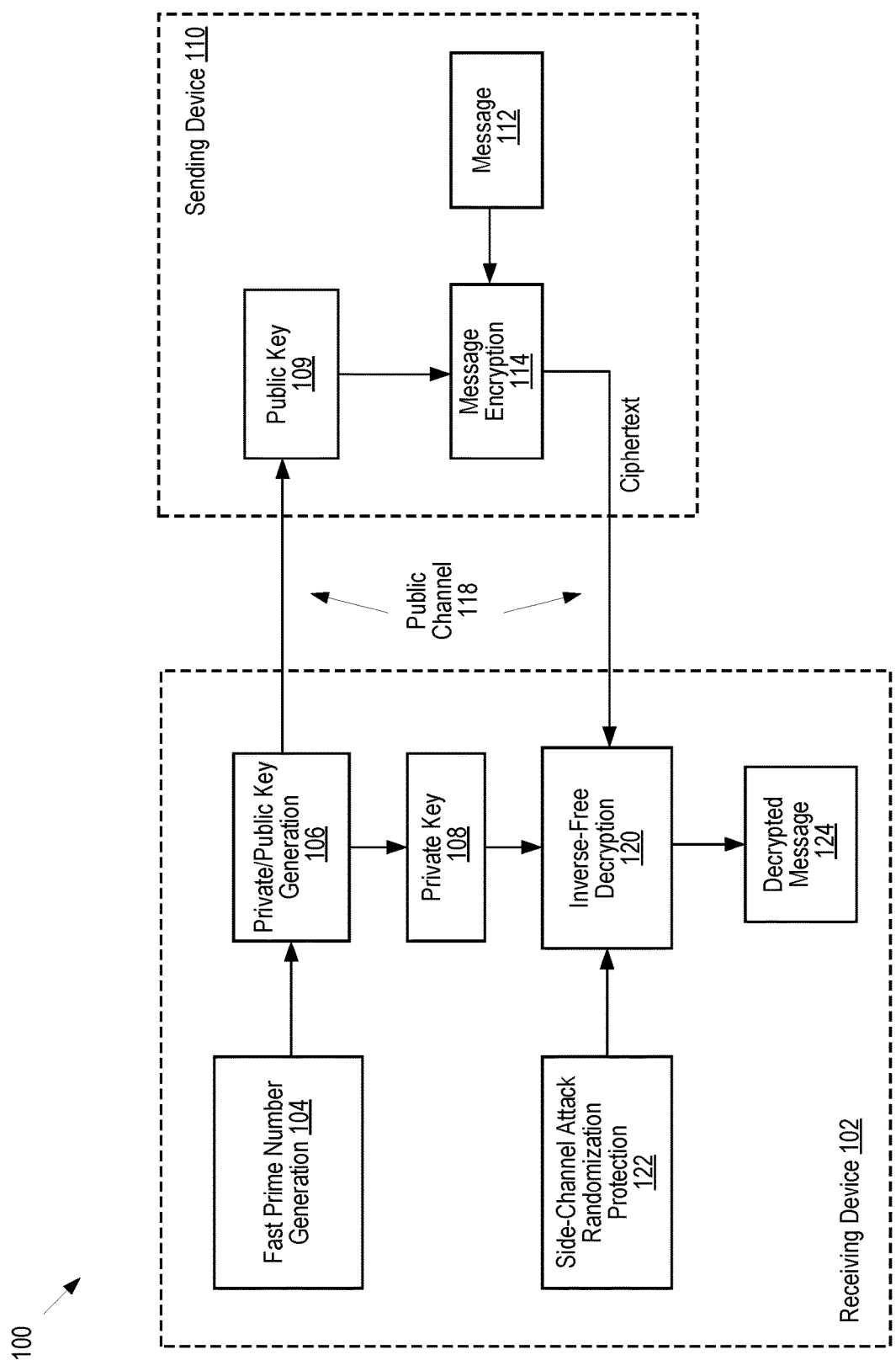
FIG. 1 illustrates an example network architecture in which various implementation of the present disclosure may operate.

FIG. 1 illustrates an example network architecture 100 in which various implementation of the present disclosure may operate. In public-key cryptography systems, computing devices may have various components/modules used for cryptographic operations on output or input messages. Computing devices may include a receiving device 102 that establishes a private key 108 and a public key 109 and provides the public key 109 to a sending device 110, which uses the public key 109 to encrypt a message 112 before sending the encrypted message (ciphertext) to receiving device 102 over a public communication channel 118. Cryptographic algorithms often involve modular arithmetic operations with modulus N (mod N operations) in which the set of all integers Z is wrapped around a circle of length N (the set $Z_N$), with any two numbers that differ by N (or by any integer multiple of N) treated as representing the same number (e.g., 16=5 mod 11 and 122=1 mod 11). Input messages used in such operations are often large binary numbers whose processing can be computationally expensive, in particular, when division operations are executed. Because cryptographic operations are often performed on devices having modest computational capabilities (e.g., microprocessors, smart card readers, wireless sensor nodes, etc.), it is important to optimize utilization of hardware (e.g., processor and memory) resources in such operations.

Examples of cryptographic applications that employ asymmetric public key/private key cryptography include Diffie-Hellman (DH) key exchanges, digital signature algorithms (DSA) to authenticate transmitted messages, various elliptic curve cryptography schemes, Rivest-Shamir-Adelman (RSA) public key/private key applications, and the like. For example, a cryptographic application (of an intended recipient of an encoded message) may perform private/public key generation 106 by selecting two (or more) large prime numbers, e.g., p and q, adopting a public exponent e (often e=3, 17, or $2^{16}+1$) and computing a secret (decryption) exponent d based on the public (encryption) exponent e and the selected numbers p and q. The numbers e and N=p·q are revealed as part of the public key 109 whereas p, q, and d are stored in secret by the recipient as parts of the private key 108. A sender of message m 112 may convert (block 114) the message into a ciphertext using modular exponentiation, $c=m^e$ mod N, and send the encrypted ciphertext c over the public communication channel 118. The recipient of the ciphertext may then decipher the ciphertext by applying another modular exponentiation, $m=c^d$ mod N, provided that the value of the decryption exponent d is selected is such a way that e·d=1 mod N*, where N*=(p−1)·(q−1) (Euler's totient function). Alternatively, as often used, N* may be taken as the least common multiplier of p−1 and q−1 (Carmichael's totient function). Because recovering the private exponent d requires factorizing a large public number N into its prime number multipliers p and q—a prohibitively-heavy computational task for large N—the encrypted message m remains safe even if its ciphertext c becomes known to others.

Instead of directly computing $c^d$ mod N, it is more economical to determine it from two related values $c_p=c^d$ mod p and $c_q=c^d$ mod q. For example, from the second condition it follows that $c^d=j \cdot q+c_q$, with some integer j. From the first condition, written as $j \cdot q+c_q=c_p$ mod p, it then follows that the integer j is $j=(c_p-c_q) \cdot (q^{-1}$ mod p) mod p resulting in the following representation (herein referred to as "asymmetric representation") for the decrypted message, known as the Chinese remainder theorem:

$$m=c^d \bmod N=q \cdot [(c_p-c_q) \cdot (q^{-1} \bmod p) \bmod p]+c_q.$$

The values $c_p$ and $c_q$ may be computed efficiently by using exponentiation to reduced powers $d_p$=d mod (p−1) and $d_q$=d mod (q−1) as follows:

$$c_p=c^{d_p} \bmod p, \ c_q=c^{d_q} \bmod q,$$

as a consequence of Fermat's little theorem, $c^{p-1}=1$ mod p (for any p) and the fact that d can be represented via d=k(p−1)+d mod (p−), with some integer k.

Alternatively, in some applications, an equivalent representation (herein referred to as "symmetric representation") for the decrypted message may be computed:

$$m \equiv c^d \bmod N = q \cdot (c_p \cdot q^{-1} \bmod p) + p \cdot (c_q \cdot p^{-1} \bmod q) \bmod N,$$

which can be verified to yield the correct identity, $c^d \bmod p = c_p$, since $[p \cdot (c_q \cdot p^{-1} \bmod q)] \bmod p = 0$ (and similarly for $c_q$).

Decryption that uses the symmetric or the asymmetric representation involves computing at least one inverse value $q^{-1} \bmod p$ (and, possibly, $p^{-1} \bmod q$, if the symmetric representation is used). Because inverse operations are computationally expensive, any such inverse values may be precomputed and stored for future use during decryption. Precomputation may be performed as part of private/public key generation 106. For example, key generation may include selecting prime numbers p and q, choosing a public exponent e, computing d, and determining values $d_p$, $d_q$, $q^{-1} \bmod p$ (and, possibly, $p^{-1} \bmod q$), and storing the selected and determined values as part of the private key 108.

Aspects and implementations of the present disclosure address the inefficiencies of storing (or generating, during the decryption process) of the inverse value $q^{-1} \bmod p$ (and/or $p^{-1} \bmod q$) by disclosing a method of performing decryption operations in cryptographic applications that avoid storing (or computing) the inverse values. Advantages of the disclosed implementations include, but are not limited to, more optimal utilization of processor and/or memory resources of one or more computing devices that perform decryption. In particular, disclosed is inverse-free decryption 120 that avoids computing $q^{-1} \bmod p$ and/or $p^{-1} \bmod q$. Also disclosed are implementations that enable randomization protection 122 of computational operations against side-channel attacks used by an adversarial attacker attempting to access secret information (e.g., private key). Additionally, disclosed are implementations that enable fast prime number generation 104 that may be used for private/public key generation 106 and for efficient decryption of encrypted messages.

In some disclosed implementations, after the receiving device 102 has obtained an encrypted ciphertext c, a processor of the receiving device 102 may access stored values p, q, $d_p$, $d_q$ (but not $q^{-1} \bmod p$ or $p^{-1} \bmod q$) and compute a first intermediate value $\alpha_p$ by multiplying ciphertext c by a first power of number q, such as $$\alpha_p = c \cdot q^{e-1} \bmod p.$$

Although, in the exemplary implementation, the first power is chosen as e−1, numerous other exponents may be used instead, as explained in more detail below. Additionally, the processing device may compute a second intermediate value $\beta_p$, by rescaling the first intermediate value $\alpha_p$ by an additional power of number q and computing a second power of the rescaled first intermediate value:

$$\beta_p = (\alpha_p \cdot q)^{d_p-2} \bmod p.$$

Although, in the exemplary implementation, the chosen second power is $d_p-2$, numerous other exponents can be used instead, as explained in more detail below. The processing device may now compute a first combined value $$\gamma_p = \alpha_p^2 \cdot \beta_p = c^{d_p} \cdot q^{-1} \bmod p = c_p \cdot q^{-1} \bmod p.$$

which combines the first intermediate value $c^{d_p}$ with the inverse $q^{-1} \bmod p$. The proof of the last formula involves Fermat's little theorem, which posits that $c^{ed_p} = c^{ed} \cdot c^{-k(p-1)} = 1 \bmod p$ and, therefore, $$\alpha_p^2 \cdot \beta_p \equiv (c \cdot q^{e-1})^2 \cdot (c \cdot q^e)^{d_p-2} \equiv c^{d_p} \cdot q^{ed_p-2} \equiv c^{d_p} \cdot q^{-1} \bmod p.$$

As a result, the first combined value $\gamma_p$ is determined with no inverse numbers computed, thus reducing processing and/or memory computations costs. A second set of similar computations may be carried out for the second number q, e.g., with intermediate values $\alpha_q = c \cdot p^{e-1} \bmod q$ and $\beta_q = (\alpha_q \cdot p)^{d_p-2} \bmod q$ used to compute the second combined value $\gamma_q = p^{-1} \bmod q$. In the symmetric representation, the received message can now be decrypted using a pair of multiplications as follows:

$$m = q \cdot \gamma_p + p \cdot \gamma_q \bmod N.$$

The terms "first power," "second power," etc., should be understood throughout this disclosure to indicate exponents that can be any numbers and should not be narrowly construed to only mean "power one," "power two," and so on. Some or all modular multiplications described in the present disclosure may be performed using Montgomery multiplication methods, including Montgomery reduction.

The described method of replacing computation of inverse values with products and positive powers may be performed using various additional realizations. In one implementation, the method can be performed using a different set of exponents, for example:

$$\alpha_p = c \cdot q^{e-2} \bmod p, \beta_p = (\alpha_p \cdot q^2)^{d_p-1} \bmod p, \gamma_p = \alpha_p \cdot \beta_p \bmod p,$$

(and analogously for $\alpha_q$, $\beta_q$, and $\gamma_q$) with the decrypted message still provided by $m = q \cdot \gamma_p + p \cdot \gamma_q \bmod N$.

In another implementation, the method can compute the number $\gamma_p$ (and similarly, the number $\gamma_q$) using a different set of intermediate values of $\alpha_p$ and $\beta_p$, such as:

$$\alpha_p = (c \cdot q)^{e-1} \bmod p, \beta_p = (\alpha_p \cdot q)^{p-1-2p} \bmod p, \gamma_p = \beta_p \cdot c \bmod p.$$

Because the decryption exponent $d_p$ is defined modulo p−1, the difference $p-1-d_p$ is non-negative, so the computations do not require performing division operations. Specifically, the computations lead to the same result as other implementations disclosed above, since $$\gamma_p \equiv ((c \cdot q)^{e-1} \cdot q)^{p-1-d_p} \cdot c \equiv (c^{e-1} \cdot q^e)^{p-1} \cdot (c^{e-1} \cdot q^e)^{-d_p} \cdot c \equiv c^{d_p} \cdot q^{-1} \bmod p,$$

as, per Fermat's little theorem, $(c^{e-1} \cdot q^e)^{p-1} \bmod p = 1$ and $ed_p \bmod p = 1$.

In some implementations, the method can be performed with the first intermediate value $\alpha_p$ obtained by multiplying the ciphertext c by a power of q that is different from either e−1 or e−2, for example:

$$\alpha_p = c \cdot q^{e-n} \bmod p, \beta_p = (\alpha_p \cdot q^n)^{d_p-s} \bmod p, \gamma_p = \alpha_p^s \cdot \beta_p.$$

(and analogously for $\alpha_q$, $\beta_q$, and $\gamma_q$) and with message decrypted using multiplication of the combined values by appropriately selected powers of the respective prime numbers:

$$m = q \cdot (\gamma_p \cdot q^{ns-2} \bmod p) + p \cdot (\gamma_q \cdot p^{ns-2} \bmod q) \bmod N.$$

In some implementations, the value of N is computed as a product of more than two prime numbers, e.g., p, q, s, etc. In such implementations, the intermediate values may be computed similarly to various methods described above, enabling to replace inverse values by products and positive powers. In particular, in implementations that use $N = p \cdot q \cdot s$, the intermediate values can be computed as follows, $$\alpha_p = (c \cdot q \cdot s)^{e-1} \bmod p, \beta_p = (\alpha_p \cdot q \cdot s)^{p-1-d_p} \bmod p,$$
$$\gamma_p = \beta_p \cdot c \bmod p$$

and analogously for the combined values $\gamma_q$ and $\gamma_s$. Using the computed combined values, the decrypted message can be determined according to:

$$m = \gamma_p \cdot q \cdot s + \gamma_q \cdot p \cdot s + \gamma_s \cdot p \cdot q \mod N$$

In some implementations, the value of N is computed as a product of one prime number by a power of another prime number, or as a product of several powers of several prime numbers, for example $N = p^k \cdot q$. In such implementations, the intermediate value $\gamma_{p^k} = m \cdot q^{-1} \mod p^k$ may be computed by treating $\gamma_{p^k}$ as a solution to the equation $(\gamma_{p^k} \cdot q)^e \equiv c \mod p^k$. The solution may be computed by solving the equation modulo p and lifting the result to a solution mod $p^k$ using Hensel's lemma or an analogous process. For example, the Hensel lifting process computes $$\gamma_{p^{i+1}} = \gamma_{p^i} + \delta \cdot (c - (\gamma_{p^i} \cdot q)^e) \mod p^{i+1},$$

where $\delta = (q^{eSM} \gamma_{p^1}^{e-1} \cdot e)^{-1} \mod p$ is the inverse of the derivative of the equation at $\gamma_{p^1}$. The value of $\delta$ may be determined (e.g., in parallel to the value $\gamma_{p^1}$) by computing:

$$\alpha = (e \cdot c \cdot q)^{e-1} \mod p, \quad \delta = \alpha^2 \cdot (e \cdot q \cdot \alpha)^{p-1-d} \mod p,$$
$$\gamma_{p^1} \delta \cdot e \cdot c \mod p.$$

Optimization of decryption operations described above can be combined with randomization (blinding) of computations to protect against power analysis attacks. Even though factorization of a large number N may be a prohibitively difficult task, decryption operations may be vulnerable to side-channel attacks. A side-channel attack may be performed by monitoring emissions (signals) produced by electronic circuits of the target's (e.g., victim's) computer. Such signals may be acoustic, electromagnetic, optical, thermal, and so on. By recording emissions, a hardware trojan and/or malicious software may be capable of correlating specific processor (and/or memory) activity with operations carried out by the processor. For example, an attacker employing a trojan may be able to detect emissions corresponding to multiple decryption operations where different known ciphertexts are decrypted with the same private key. As a result, by analyzing (e.g., using methods of statistical analysis) hardware emissions of the processing device, the attacker may be able to determine the private key.

Aspects of the present disclosure enable protection of cryptographic operations by implementing intermediate randomization that does not change the ultimate outcome of the computation (e.g., the value of the decrypted message m) but decreases the amount of correlations between different instances of decryption. For example, one or more random numbers can be used to make results of intermediate computations less predictable even when the same ciphertext is being decrypted. Such randomized protective measures improve security of cryptographic operations by making it more difficult for side-channel attackers to correlate signals emitted by the processing device. In some implementations, during computation of the first combined value $\gamma p$, the processing device can select (e.g., generate or pick from a previously generated list) a random number $r_p$ and rescale the number q by the selected random number $r_p$ during computation of the first intermediate number:

$$\alpha_p = c \cdot (r_p \cdot q)^{e-1} \mod p.$$

The similar rescaling is performed during the computation of the second intermediate value:

$$\beta = (\alpha_p \cdot r_p \cdot q)^{d_p - 2} \mod p.$$

The first combined value now has the extra multiplier of $r_p^{-1} \mod p$:

$$\gamma_p = c_p \cdot r_p^{-1} \cdot q^{-1} \mod p,$$

The extra multiplier can be compensated with multiplication by $r_p$ during the final determination of the message m. Likewise, a random number $r_q$ can be used during computation of the second combined value $\gamma_q$, using the same expressions as above, in which the replacement $p \leftrightarrow q$ is made. The message being decrypted can now be determined using, $$m = (r_p \cdot q \cdot \gamma_p \mod p) + (r_q \cdot p \cdot \gamma_q \mod q) \mod N$$

In some implementations, the two random numbers can be selected equal, $r_p = r_q = r$. In this case, the message can be decrypted using, $$m = r \cdot ((q \cdot \gamma_p \mod p) + (p \cdot \gamma_q \mod q)) \mod N$$

In this way, all calculations modulo either p or q may be protected by the randomized blinding method.

Similarly, the randomization can be performed with any other powers, e.g., $$\alpha_p = c \cdot (r_p \cdot q)^{e-n} \mod p, \quad \beta_p = (\alpha_p \cdot (r_p \cdot q)^n)^{d_p - 2} \mod p,$$
$$\gamma_p = \alpha_p^s \cdot \beta_p,$$

(and analogously for $\alpha_q$, $\beta_q$, and $\gamma_q$) and with message decrypted using multiplication of the combined values by appropriately selected powers of the respective prime numbers:

$$m = r_p \cdot q \cdot ((r_p \cdot q)^{ns-} \cdot \gamma_p \mod p) + r_q \cdot p \cdot ((r_q \cdot p)^{ns-2} \gamma_q \mod q) \mod N.$$

Likewise, the randomization can also be performed in implementations that use exponentiation to the power $p-1-d_p$. More specifically (and similarly for $\alpha_q$, $\beta_q$, and $\beta_q$):

$$\alpha_p = (c \cdot r_p \cdot q)^{e-1} \mod p, \quad \beta_p = (\alpha_p \cdot r_p \cdot q)^{p-1-d_p} \mod p,$$
$$\gamma_p = \beta_p \cdot c \mod p.$$

The decrypted message can then be computed in the same way as above:

$$m = (r_p \cdot q \cdot \gamma_p \mod p) + (r_q \cdot p \cdot \gamma_q \mod q) \mod N$$

Figure 2:
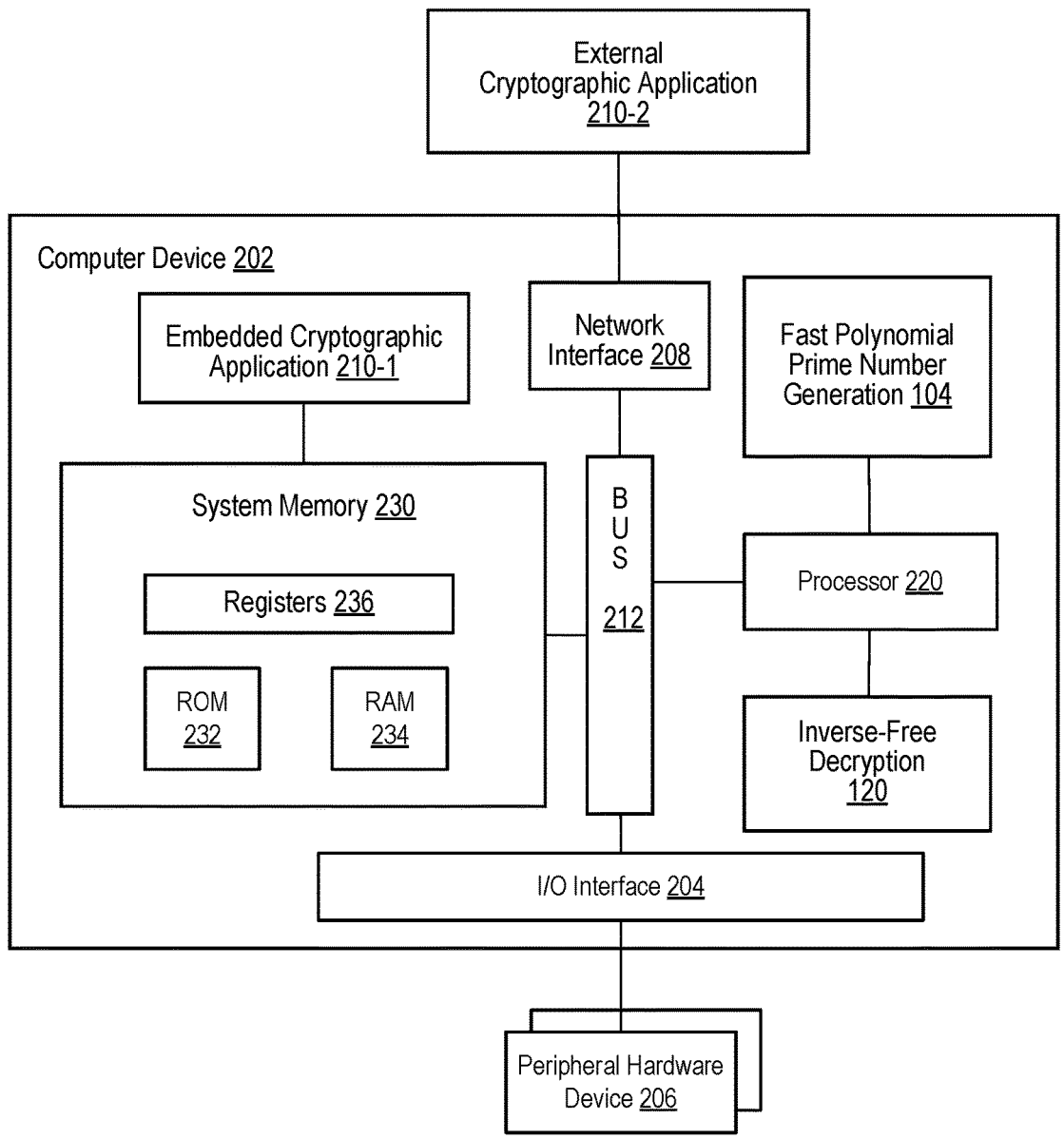
FIG. 2 is a block diagram illustrating an example computer system in which various implementations of the present disclosure may operate.

FIG. 2 is a block diagram illustrating an example computer system 200 in which various implementations of the present disclosure may operate. The example computer system 200 may be a desktop computer, a tablet, a smartphone, a server (local or remote), a thin/lean client, and the like. The example computer system 200 may be a smart a card reader, a wireless sensor node, an embedded system dedicated to one or more specific applications (e.g., cryptographic applications 210), and so on. The example computer system 200 may include, but not be limited to, a computer device 202 having one or more processors 220 (e.g., central processing units (CPUs)) capable of executing binary instructions, and one or more system memory 230 devices. "Processor" refers to a device capable of executing instructions encoding arithmetic, logical, or I/O operations. In one illustrative example, a processor may follow Von Neumann architectural model and may include an arithmetic logic unit (ALU), a control unit, and a plurality of registers.

The computer device 202 may further include an input/output (I/0) interface 204 to facilitate connection of the computer device 202 to peripheral hardware devices 206 such as card readers, terminals, printers, scanners, internet-of-things devices, and the like. The computer device 202 may further include a network interface 208 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer device 202. Various hardware components of the computer device 202 may be connected via a bus 212 which may have its own logic circuits, e.g., a bus interface logic unit.

The computer device 202 may support one or more cryptographic applications 210, such as an embedded cryptographic application 210-1 and/or external cryptographic application 210-2. The cryptographic applications 210 may be secure authentication applications, encrypting applications, decrypting applications, secure storage applications, and so on. The external cryptographic application 210-2 may be instantiated on the same computer device 202, e.g., by an operating system executed by the processor 220 and residing in the system memory 230. Alternatively, the external cryptographic application 210-2 may be instantiated by a guest operating system supported by a virtual machine monitor (hypervisor) executed by the processor 220. In some implementations, the external cryptographic application 210-2 may reside on a remote access client device or a remote server (not shown), with the computer device 202 providing cryptographic support for the client device and/or the remote server.

The processor 220 may include one or more processor cores having access to a single or multi-level cache and one or more hardware registers. In implementations, each processor core may execute instructions to run a number of hardware threads, also known as logical processors. Various logical processors (or processor cores) may be assigned to one or more cryptographic applications 210, although more than one processor core (or a logical processor) may be assigned to a single cryptographic application for parallel processing. A multi-core processor 220 may simultaneously execute multiple instructions. A single core processor 220 may typically execute one instruction at a time (or process a single pipeline of instructions). The processor 220 may be implemented as a single integrated circuit, two or more integrated circuits, or may be a component of a multi-chip module.

The system memory 230 may refer to a volatile or non-volatile memory and may include a read-only memory (ROM) 232, a random-access memory (RAM) 234, as well as (not shown) electrically erasable programmable read-only memory (EEPROM), flash memory, flip-flop memory, or any other device capable of storing data. The RAM 234 may be a dynamic random-access memory (DRAM), synchronous DRAM (SDRAM), a static memory, such as static random-access memory (SRAM), and the like.

The system memory 230 may include one or more registers 236 to store a cryptographic key and intermediate values during the decryption operations (e.g., p, q, $\alpha_p$, $\beta_p$, $r_p$, $\gamma_p$, etc.). In some implementations, registers 236 may be implemented as part of RAM 234. In some implementations, some or all of registers 236 may be implemented separately from RAM 234. Some or all of registers 236 may be implemented as part of the hardware registers of the processor 220. In some implementations, the processor 220 and the system memory 230 may be implemented as a single field-programmable gate array (FPGA).

The computer device 202 may include a fast prime number generation 104 module to assist in key generation and may further include an inverse-free decryption 120 module for optimization of use of processor 220 and system memory 230 resources during message decryption, in accordance with implementations of the present disclosure. The fast prime number generation 104 and the inverse-free decryption 120 may be implemented in software, hardware (e.g., as part of the processor 220), firmware, or in any combination thereof. In some implementations, the fast prime number generation 104 and the inverse-free decryption 120 may access the contents of registers 236 to retrieve and store data used and generated during respective operations.

Figure 3:
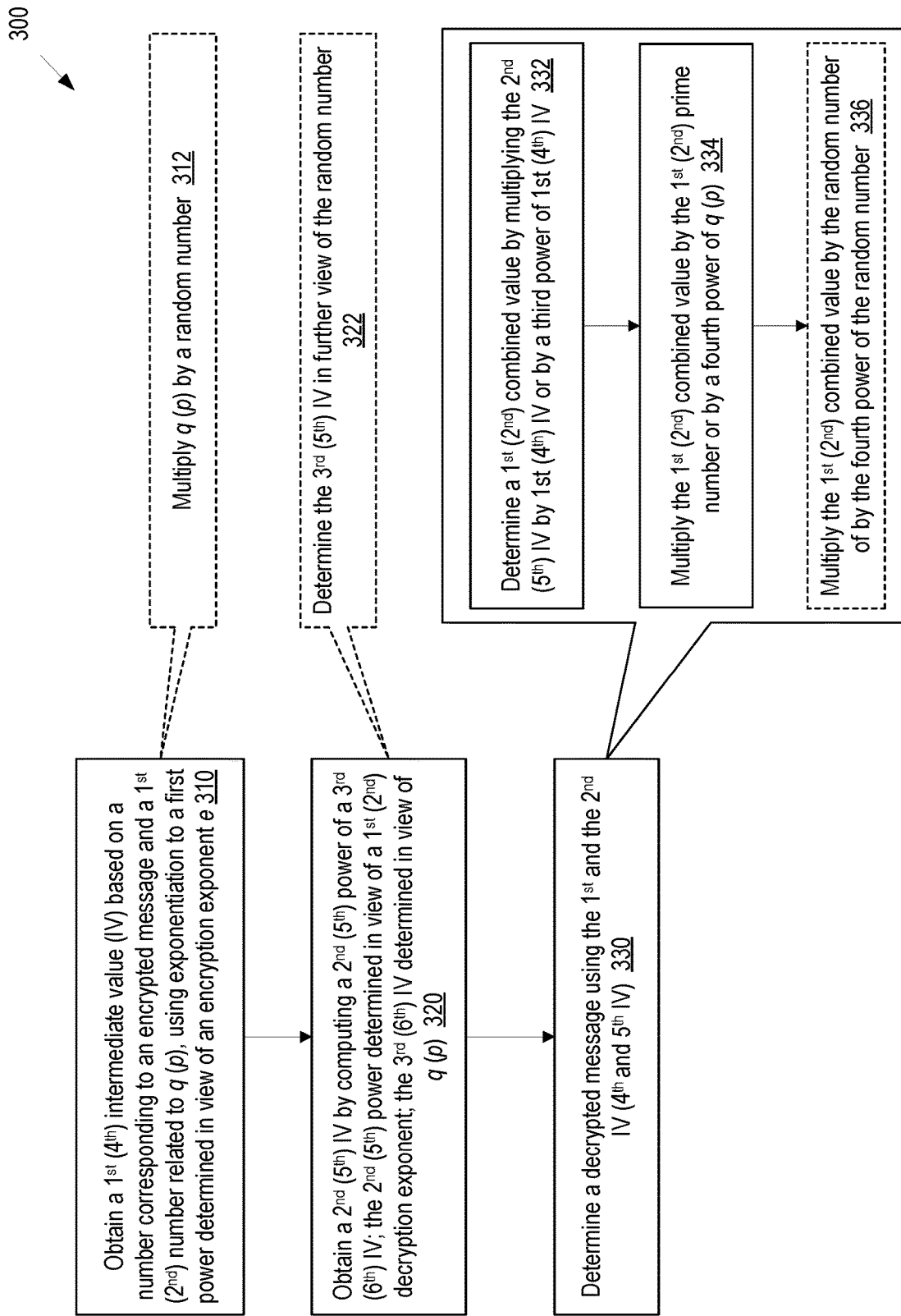
FIG. 3 depicts a flow diagram of an illustrative example of method of optimization of decryption operations by avoiding computations of inverse values, in accordance with one or more aspects of the present disclosure.

FIG. 3 depicts a flow diagram of an illustrative example of method 300 of optimization of decryption operations by avoiding computations of inverse values, in accordance with one or more aspects of the present disclosure. Method 300 and/or each of its individual functions, routines, subroutines, or operations may be performed by one or more processing units of the computing system implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. Various operations of method 300 may be performed in a different order compared with the order shown in FIG. 3. Some blocks may be performed concurrently with other blocks. Some blocks may be optional. Some or all of the block of method 300 may be performed by inverse-free decryption 120 module.

Method 300 may be implemented by processor 220 (or an arithmetic logic unit, an FPGA, and the like, or any processing logic, hardware or software or a combination thereof) performing a cryptographic operation, which may be based on a private key that includes a first prime number (q) and a second prime number (p). In some implementations, the private key may include three or more prime numbers. At least some operations of method 300 may be modular arithmetic operations, e.g., mod q, mod p, mod pq operations, and the like. Some or all such modular multiplications may be performed using Montgomery reduction.

Method 300 may involve receiving a number c corresponding to an encrypted message (ciphertext) from sending device 110. At block 310, method 300 may involve obtaining, by a processing device, a first intermediate value (e.g., $\alpha_p$) based on the number c corresponding to an encrypted message and a first number related to the first prime number. In some implementations, obtaining the first intermediate value (e.g., $\alpha_p$) may include multiplying the number c corresponding to the encrypted message by a first power of a first number related to the first prime number q, e.g., $c \cdot q^{e-n}$. In some implementations, obtaining the first intermediate value (e.g., $\alpha_p$) may include exponentiating, to the first power, a product of the number corresponding to the encrypted message c and the first number related to the first prime number, e.g. computing $(c \cdot q)^{e-1}$.

In some implementations, the first number related to the first prime number may be the first prime number q itself. In some implementations (as indicated by an optional block 312), the first number related to the first prime number may be a number derived from the first prime number q. For example, the first number related to the first prime number may be obtained using multiplication of the first prime number q by a random number r: $q \cdot r$. The first intermediate value $\alpha_p$ may be obtained by multiplying the number c corresponding to the encrypted message by a first power of the first number related to the first prime number. For example, the first intermediate value $\alpha_p$ may be one of $cq^{e-1}$, $cq^{e-2}$, $c(q \cdot r)^{e-1}$, $c(q \cdot r)^{e-2}$, $c(q \cdot r)^{e-n}$, and so on, wherein the first power (e.g., e−n) may be determined in view of an encryption exponent e for the cryptographic operation.

At block 320, method 300 may continue with the processing device obtaining a second intermediate value (e.g., $\beta_p$) by computing a second power of a third intermediate value. In some implementations, the third intermediate value may be determined in view of the first prime number q, e.g., the third intermediate value may be $\alpha_p q$, $\alpha_p q^2$, $\alpha_p q^n$, etc. The second power (e.g., $d_p-1$, $d_p-2$, $d_p-s$, etc.) may be determined in view of a first decryption exponent $d_p$. Accordingly, the second intermediate value may be $\beta_p = (\alpha_p q)^{d_p-2}$, $(\alpha_p q^2)^{d_p-1}$ $(\alpha_p q^n)^{d_p-2}$, etc. The second power may be chosen in conjunction with the first power. In some implementations, the first power is the encryption exponent reduced (decremented) by one, e−1, and the second power is the first decryption exponent reduced by two, $d_p-2$. In some implementations, the first power is the encryption exponent reduced by two, e −2, and the second power is the first decryption exponent reduced by one, $d_p-1$. In some implementations, the second power is equal to a decremented difference of the first prime number and the first decryption exponent (e.g., $p-1-d_p$). In such implementations, the third intermediate value may include a product of the first prime number and the first number related to the first prime number e.g., $\alpha_p \cdot q$. Accordingly, the second intermediate value may be $(\alpha_p \cdot q)^{p-1-d_p}$.

In some implementations, the third intermediate value may be determined (optional block 322) in further view of the random number r, e.g., as $\alpha_p(q \cdot r)$, $\alpha_p(q \cdot r)^2$, $\alpha_p(q \cdot r)^n$, etc. Accordingly, the second intermediate value may be $\beta_p = (\alpha_p q \cdot r)^{d_p-2}$, $(\alpha_p(q \cdot r)^2)^{d_p-1}$, $(\alpha_p(q \cdot r)^n)^{d_p-s}$, etc.

At block 330, method 300 may continue with the processing device determining a decrypted message using the first intermediate value (e.g., $\alpha_p$) and the second intermediate value (e.g., $\beta_p$). More specifically, in some implementations, at block 332, the processing device may determine a first combined value (e.g., $\gamma_p$) by multiplying the second intermediate value (e.g., $\beta_p$) by the first intermediate value (e.g., $\alpha_p$), e.g., $\gamma_p = \alpha_p \beta_p$, or by a third power (e.g., power 2, s, etc.) of the first intermediate value, e.g., $\gamma_p = \alpha_p^2 \beta_p$, $\alpha_p^s \beta_p$, etc. At block 334, the processing device may multiply the first combined value (e.g., $\gamma_p$) by the first prime number q. In some implementations, the processing device may multiply the first combined value (e.g., $\gamma_p$) by a fourth (e.g., ns−1) power of the first prime number q, for example: $\gamma_p \cdot q^{ns-1}$.

In some implementations, blocks 310-334 may be repeated (e.g., in parallel or sequentially) for a second prime number p with the operations differing from the operations described above in conjunction with blocks 310 -334 by the replacement q↔p. More specifically, in conjunction with another instance of block 310, a fourth intermediate value (e.g., $\alpha_q$) may be obtained by multiplying the number (e.g., c) corresponding to the encrypted message by the first power of a second number related to the second prime number. The second number related to the second prime number may be the second prime number p itself or the second prime number may be a number derived from the second prime number p. In some implementations, the second number related to the second prime number may be obtained using multiplication of the second prime number p by a random number r: p·r. (The random number may be the same as or different than the random number used for blinding the first prime number.) The fourth intermediate value may be obtained by multiplying the number c corresponding to the encrypted message by the first power of the second number related to the second prime number. For example, the fourth intermediate value may be one of $cp^{e-1}$, $cp^{e-2}$, $c(p \cdot r)^{e-1}$, $c(p \cdot r)^{e-2}$, $c(p \cdot r)^{e-n}$, and so on.

In conjunction with another instance of block 320, a fifth intermediate value (e.g., $\beta_q$) may be computed as a fifth power of a sixth intermediate value. In some implementations, the sixth intermediate value may be determined in view of the second prime number p. For example, the sixth intermediate value may be $\alpha_q p$, $\alpha_q p^2$, $\alpha_q p^n$, etc. The fifth power (e.g., $d_q-1$, $d_q-2$, $d_q-s$, etc.) may be determined in view of a second decryption exponent $d_q$. Accordingly, the fifth intermediate value may be $\beta_q = (\alpha_q p)^{d_q-2}$, $(\alpha_q p^2)^{d_q-1}$, $(\alpha_q p^n)^{d_q-s}$, etc. The fifth power may be chosen in conjunction with the first power. In some implementations, the first power is the encryption exponent reduced by one e−1 and the fifth power is the second decryption exponent reduced by two, $d_q-2$. In some implementations, the first power is the encryption exponent reduced by two, e−2, and the fifth power is the second decryption exponent reduced by one, $d_q-1$. The sixth intermediate value may be determined in further view of the random number r, e.g., as $\alpha_q(p \cdot r)$, $\alpha_q(p \cdot r)^2$, $\alpha_q(p \cdot r)^n$, etc. Accordingly, the fifth intermediate value may be $\beta_q = (\alpha_q p \cdot r)^{d_q-2}$, $(\alpha_q(p \cdot r)^2)^{d_q-1}$, $(\alpha_{q\_1 \, (p \cdot r)}{}^n)^{d_q-s}$, etc.

In conjunction with another instance of block 330, method 300 may continue with the processing device determining a decrypted message using the fourth intermediate value (e.g., $\alpha_q$) and the fifth intermediate value (e.g., $\beta_q$). More specifically, the processing device may determine a second combined value (e.g., $\gamma_q$) by multiplying the fifth intermediate value (e.g., $\beta_q$) by the fourth intermediate value (e.g., $\alpha_q$), e.g., $\gamma_q = \alpha_q \beta_q$, or by the third power (e.g., power 2, s, etc.) of the fourth intermediate value, e.g., $\gamma_q = \alpha_q^2 \beta_q$, $\alpha_q^2 \beta_q$ etc. In conjunction with another instance of block 334, the processing device may multiply the second combined value (e.g., $\gamma_q$) by the second prime number p. In some implementations, the processing device may multiply the second combined value (e.g., $\gamma_q$) by the forth (e.g., ns−1) power of the second prime number p, e.g., $\gamma_q \cdot p^{ns-1}$.

At block 336, method 300 may continue with multiplying a number based on the first combined value by the random number. The number based on the first combined value may additionally be based on the second combined value, e.g., $q \cdot \gamma_p + p \cdot \gamma_q$, and upon multiplication (modulo pq) determine the decrypted message $m = r \cdot (q \cdot \gamma_p + p \cdot \gamma_q)$ or $m = r^{ns-1} \cdot (q \cdot \gamma_p + p \cdot \gamma_q)$ In some implementations, the first combined value and the second combined value can be first multiplied by the random number and then added together, e.g., $m = r^{ns-1} \cdot (q^{ns-1} \cdot \gamma_p) + r^{ns-1} \cdot (p^{ns-1} \gamma_q)$. In particular, multiplication followed by addition may be performed when different random numbers are used for blinding: $m = r_1{}^{ns-1} \cdot (q^{ns-1} \cdot \gamma_p) + r_2{}^{ns-1} \cdot (p^{ns-1} \cdot \gamma_q)$.

Prime numbers (e.g., p and q) used in cryptographic applications (e.g., employing the Rivest-Shamir-Adleman key exchange, the Diffie-Hellman key exchange, the Digital Signature algorithms, elliptic curve applications, and the like) may be generated based on any known methods, such as Atkin-Bernstein sieve, sieve of Eratosthenes, Joye-Paillier method, or the like. Candidate prime numbers can be tested for primality using any known tests, such as the Pocklington primality test, the Baillie-Pomerance-Selfridge-Wagstaff primality test, the Miller-Rabin primality test, or the like. Existing methods of generating primes, however, suffer from a number of shortcomings. For example, generating random numbers and testing for primality provides a rather low yield of prime numbers, as it may take about 700 tries on average to identify one 1024-bit prime number.

Algorithms that deterministically search for prime numbers based on failed attempts may be capable of finding prime numbers faster, but may be vulnerable to power analysis attacks, such as simple power analysis (SPA) attacks, differential power analysis (DPA) attacks, and so on. A side-channel attacker intercepting hardware emissions may be capable of acquiring additional information with each iteration of the generating algorithm until the attacker becomes capable of ascertaining what candidate numbers are being tested, leading to a potential exposure of the eventual identified prime numbers.

Disclosed herein are fast and efficient methods of generating prime numbers that have enhanced resistance to power analysis attacks. Disclosed implementations are described in reference to FIG. 4 that depicts schematically an example sequence of operations during efficient generation of prime numbers and use of the generated prime numbers in cryptographic application. Disclosed implementations may involve employing polynomial functions for generation of candidate prime numbers. In some implementations, the polynomial functions may be operating on input numbers classified by their residue (e.g., quadratic residue) properties. A quadratic residue Y modulo a number P is a number that is congruent to (different by a multiple of P from) a square of some number Z: $Y = Z^2$ mod P. Conversely, a quadratic nonresidue (QNR) Y modulo P is a number that is not congruent, $Y \neq X^2$ mod P to a square of any number X. Accordingly, selecting a number $-u$ such that $-u \neq X^2$ mod P (QNR modulo P) for any number X enables to construct the quadratic polynomial $X^2 + u$ whose value for any number X is not divisible by P (since by construction $X^2 + u \neq 0$ mod P).

For a set of numbers $\{P_i\}$, selecting a number u (block 410) such that $-u \neq X^2$ mod $P_i$ for any number X and for all numbers $P_j$ of the set ensures that the polynomial $X^2 + u$ is not divisible by any number $P_i$ of the set $\{P_i\}$. Based on this property, in some implementations, the set of numbers $\{P_i\}$ may be chosen to include some (or all) prime numbers up to a target number (e.g., the first 50 prime numbers, the first 100 prime numbers, and so on): $\{P_i\} = 3, 5, 7, 11, 13, 17, 19, 23 \ldots$ In some implementations, the set of numbers $\{P_i\}$ may be different from the first m prime numbers, as some prime numbers (e.g., 2, in this example) may be excluded while some additional (e.g., larger prime) numbers may be included, and so on. Therefore, selecting an arbitrary number X modulo $M = \Pi_j P_j$ ensures that the number $F(X) = X^2 + u$ is not divisible by any of $P_i$. This increases the likelihood that $F(X) = X^2 + u$ is a prime number, compared with a random selection of potential candidates. The use of one or more such polynomials, therefore, speeds up successful prime number generation. Other polynomials may be used for generation of candidate numbers (herein also, "candidates"). For example, since by construction, for all X it holds that $-u \neq X^{-2}$ mod $P_i$, the polynomial $G(X) = u \cdot X^2 + 1$ is likewise not divisible by any of $P_i$. Therefore, the polynomial function G(X) can be used in place of the function F(X) (or together with the function F(X), as explained in more detail below). Compared with the function F(X), the polynomial function G(X) includes one additional multiplication, which in many instances may be an acceptable increase of the involved computational time. Other polynomials can be used as well, e.g., polynomials that have no roots modulo any $P_i$ of the set $\{P_i\}$, e.g., a general quadratic polynomial $G(X) = s \cdot X^2 + t \cdot X + u$ provided that $s \cdot X^2 + t \cdot X + u \neq 0$ mod $P_i$ for any X, which upon multiplication by 4s and rearrangement in the form $(2s \cdot X + t)^2 - t^2 + 4s \cdot u \neq 0$ mod $P_i$, requires that the number $t^2 - 4s \cdot u$ is QNR for all $P_i$.

Various algorithms may be used to identify numbers $-u$ that are QNR for a set of $\{P_i\}$ numbers. Approximately a half of all numbers are QNR modulo each $P_i$, with another half being QR. Various tests can be used to determine whether a number $u_i$ is a QR or QNR modulo $P_i$, such as randomly choosing $u_i$ within interval $[2, P_i - 1]$, calculating $u_i^{(P_i - 1)/2}$ mod $P_i$, using quadratic reciprocity, and so on. Once a value for $u_i$ has been determined modulo each prime or prime-power $P_i$, a value of u may be calculated using Chinese Remainder Theorem. Various QNR $-u$ can be precomputed and stored, e.g., in a QNR list in a read-only memory of the processing device that generates prime numbers. A number $-u$ may be selected (e.g., randomly) from the stored QNR list and used to form one of the polynomials F(x), G(x), H(x), and the like. At block 420, a number X may then be selected (e.g., randomly, in some implementations), and at block 430 a candidate number $Z = F(X)$ mod $M = (X^2 + u)$ mod M may be generated where M may be a product of the set $\{P_i\}$: $M = \Pi_i P_i$. One of primality tests may then be applied (block 435) to the candidate Z. In case the candidate Z fails a primality test, another number X may be selected (e.g., also randomly) and the process repeated until a successful prime number Z is obtained.

The number M may serve as the upper number for the candidates (and, therefore, generated primes) and may be selected based on a target size of the desired key. The numbers X used as input into the polynomial function(s) may be selected uniformly from a range $[0, X_{max} - 1]$, which may be the same or different (e.g., smaller or larger) than the range $[0, M-1]$. The numbers X may be selected uniformly from the range of X, e.g., with equal likelihood to be selected within different sub-ranges of X. Because QR/QNR are not distributed uniformly, the candidate outputs Z may be distributed with a degree of non-uniformity within the range $[0, M-1]$. In some implementations, to ensure the uniformity of candidate outputs Z, additional instances of polynomials may be used.

In some implementations, at block 420, a set of numbers (e.g., random numbers) $\{X_j\}$ may be generated (e.g., uniformly within the range of X) instead of a single value X. The candidate number may be generated (at block 430) using a product of n instances (the n-product) of the polynomials:

$$Z = \prod_{j=1}^{n}(X_j^2 + u) \mathrm{mod} M,$$

or $$Z = \prod_{j=1}^{n}(u \cdot X_j^2 + 1) \mathrm{mod} M.$$

With increasing n, the degree of uniformity of the candidate outputs Z increases. For a product of $n = 5$ polynomials, the degree of uniformity is characterized by losses of approximately 0.055 bits of entropy for each generated prime number, or approximately 0.11 bits of for each pair of cryptographic primes p and q. With the further increase of the number of polynomial instances n, additional incremental improvements in uniformity may be achieved, but in many cryptographic applications it may be sufficient (for adequate protection against side-channel attacks) to implement $n = 5$ or $n = 6$ instances of polynomial functions. For increased uniformity (and protection), any higher number $n > 6$ may be used. The enhanced uniformity of outputs may be weighed against increased amount of computations associated with additional multiplications and operations used to generate additional $X_j$. In some implementations, any other polynomials $G(x)$, $H(x)$, and the like, may be used in the product of the polynomials. In some implementations, all polynomial instances j may involve the same polynomial function. In some implementations, some polynomial instances, e.g., j=1, 2, 3, may involve a first kind of a polynomial (e.g., $F(x)$) whereas other polynomial instances, e.g., j=4, 5, 6, may involve a second kind of a polynomial (e.g., $G(x)$).

Operations that are performed to generate a candidate number (for a given number of polynomial instances n) include 2n−1 multiplications and n additions when polynomials $F(x)$ are used, or 3n−1 multiplications and n additions when polynomials $G(x)$ are used. When a computed candidate number Z is an even number, an odd number may be added before the primality testing is performed, for example, M, or any other predetermined number. In some implementations, the n-product may be modified to output an odd number, e.g., using a modulo 2M arithmetic operation:

$$Z = \prod_{j=1}^{n} (2 \cdot (X_j^2 + u) + M) \bmod 2M,$$

or $$Z = \prod_{j=1}^{n} (2 \cdot (X_j^2 \cdot u + 1) + M) \bmod 2M.$$

Other variations of these expressions may be used to ensure that the candidate Z is a number that is both odd and 2 mod 3 (a number 1 less than a multiple of 3), which may be useful when the public exponent e=3. Similarly, it may be ensured that the candidate Z is 3 mod 4 (a number 1 less than a multiple of 4), or that Z is k mod n, e.g., $$Z = \prod_{i=1}^{n} (n \cdot (X_i^2 + n) + (k \cdot M^{-1} \bmod N)M) \bmod nM.$$

As should be recognized by a person skilled in this technology, numerous other similar polynomial product-based expressions can be used to generate prime number candidates that satisfy various additional target conditions, by adjusting the form of the polynomials or the modular operations.

Figure 4:
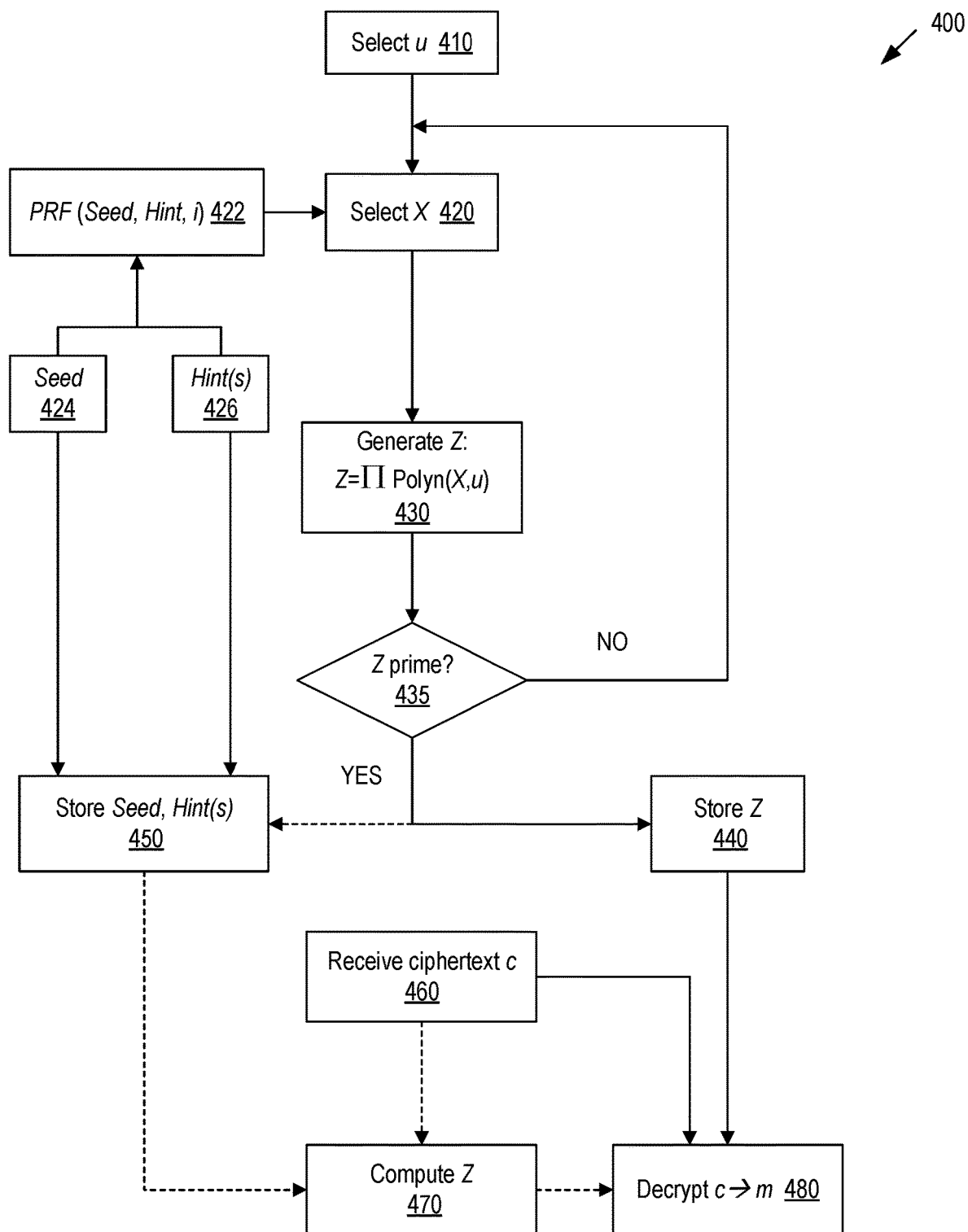
FIG. 4 depicts schematically an example sequence of operations during efficient generation of prime numbers and use of the generated prime numbers in cryptographic application, in accordance with one or more aspects of the present disclosure.

When a computed candidate number Z is determined not to be a prime number, a different set of input numbers $\{X_i\}$ may be selected and another n-product of polynomials may be computed, as indicated by the NO-loop in FIG. 4. Alternatively, in some implementations, one or more additional numbers $X_{n+1}, X_{n+2} \ldots$ may be generated and the new candidate number $Z^*$ obtained according to $$Z^* = Z \cdot (X_{n30\ 1}^2 + u) \cdot (X_{n+2}^2 u) \ldots \bmod M.$$

Primality testing may be performed using any available test, such as the Pocklington test, the BailliePSW test, the Miller-Rabin test, or the like.

In some implementations, depending on the desired size of the prime numbers, a lower bound L may be set for the target range of Z. In some implementations, the lower bound may be a soft bound, with the candidate numbers that are below (but not significantly below) the lower bound deemed acceptable. Similarly, in some implementations, the candidate numbers that are above (but not significantly above) the lower bound may still be excluded. In one illustrative example, after the candidate number Z is determined, a modified candidate number $Z_L$ may be computed as follows:

$$Z_L = L + (Z - L \bmod M),$$

ensuring that $Z_L \in [L, M+L-1]$. In some implementations, L may be comparable to M (e.g., by an order of magnitude). In some implementations, L can be a multiple of M, pushing the interval $[L, M+L-1]$ to values that are outside (and do not overlap with) the interval $[0, M-1]$. In some implementations, a larger range can be obtained by taking L to be a random multiple of M: $L = R \cdot M$ where a random number R may be taken within a predefined interval corresponding to a desired (target) range of prime numbers. In some implementations, the random number R can be selected once for a particular instance of the prime number being generated and reused for all attempts to obtain this prime number (with other random numbers R selected when additional prime numbers are sought). In some implementations, the random number R can be resampled for each attempt (e.g., each application of the n-product) to obtain the prime number.

In some implementations, modular operations may be performed using Montgomery multiplication that replaces division by the modulus (e.g., M) with a Montgomery reduction operation, which amounts to adding an appropriately chosen multiple of M until the result is a multiple of an auxiliary Montgomery modulus and thus amenable to a simple transformation (e.g., cancellation the low bits of the result).

In some implementations, generation of the set of numbers $\{X_j\}$ may be performed using one or more pseudorandom functions (PRF), e.g., a function which generates outputs deterministically (so that the same inputs generate the same inputs), while the outputs appear similar to random numbers (block 422). A PRF may use a seed number Seed (block 424), an identifier j (e.g., enumerator) of the number $X_j$ being generated and a hint Hint (block 426) that may change (deterministically or randomly) between different attempts (applications of the n-product) in generating the prime number:

$$X_j = \text{PRF (Seed}, j, \text{Hint)}.$$

In some implementations, Seed may be a longer number (e.g., a 128-bit number, a 256-bit number, and the like), whereas Hint may be a shorter number (e.g., a 16-bit number, a 32-bit number, and the like). The inputs Seed and Hint may be stored as a secret information and may be protected, during execution of PRF( ) using various methods of blinding, masking, or other types of cryptographic protection.

In some implementations, Seed may be generated randomly, for each prime number generating session, for each particular time period, every time the processing device is powered on, and so on. Seed may be generated from a hardware key, such as a PUF (physical unclonable function) key that is based on manufacturing characteristics of a hardware device. Upon a successful prime number identification using the methods disclosed above, as depicted by dashed arrows in FIG. 4, at block 450, the processing device may store Seed and Hint (and, optionally, if one or more additional numbers $X_{n+1}, X_{n+2} \ldots$ were employedthe total number $j_{max\ o}$f the numbers Xused in the n-product) whereas the actual generated prime number (p and/or q) may not be stored (e.g., for additional protection of secret information). Respectively, when a ciphertext c is received (block 460), the processing device may access stored Seed, Hint (and, optionally, $i_{max}$) and generate the set $\{X_j\}$ using PRF( ). Based on the generated set $\{X_j\}$, the processing device can recover, applying the n-product to the set $\{X_j\}$ (or $j_{max}$-product, if $j_{max} > n$) to recover the prime number (block 470) and decrypt the encrypted message (block 480). A similar process may be used to reproduce other prime numbers of the cryptographic key, such as q (and/or any additional prime numbers as may be used by the decryption algorithm). For example, to reproduce multiple prime numbers, e.g., p and q, a single Seed and multiple hints may be stored, e.g., $Hint_1$, $Hint_2$ . . . In some implementations, a single Seed and a single hint, e.g., $Hint_1$, may be stored whereas other hints $Hint_2$ . . . may be deterministically determined based on $Hint_1$. In some implementations, as depicted by solid arrows in FIG. 4, the generated prime numbers may be stored directly (block 440) and used for decryption of a received ciphertext (block 480).

Figure 5:
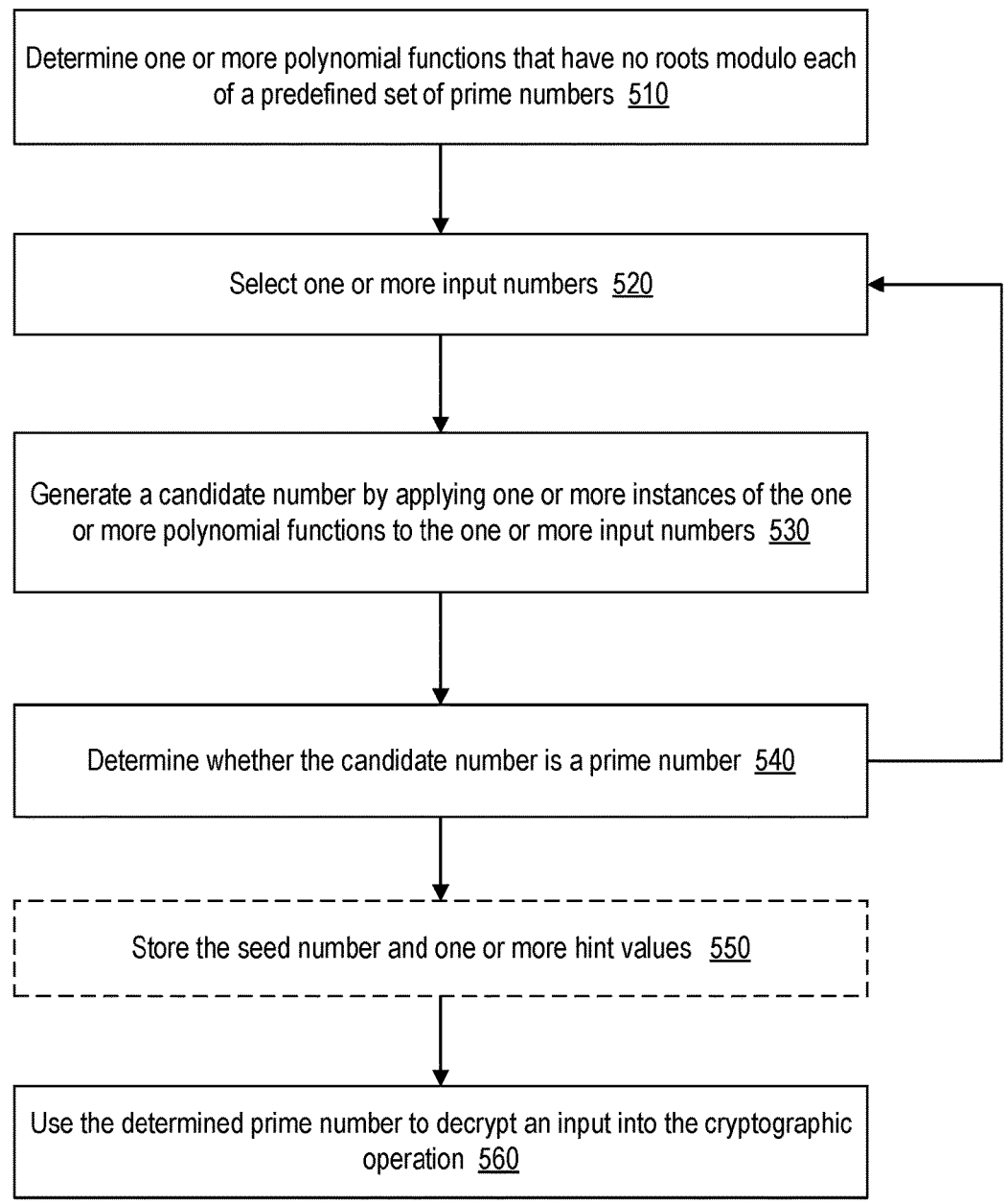
FIG. 5 depicts a flow diagram of an illustrative example of method of generating and using prime numbers in cryptographic applications, in accordance with one or more aspects of the present disclosure.

FIG. 5 depicts a flow diagram of an illustrative example of method 500 of generating and using prime numbers in cryptographic applications, in accordance with one or more aspects of the present disclosure. Method 500, as well as method 600 disclosed below, and/or each of their individual functions, routines, subroutines, or operations may be performed by one or more processing units of the computing system implementing the methods, e.g., the processor 220. In certain implementations, each of methods 500 and 600 may be performed by a single processing thread. Alternatively, each of methods 500 and 600 may be performed by two or more processing threads, each thread executing one or more individual functions, routines, subroutines, or operations of the method. In an illustrative example, the processing threads implementing each of methods 500 and 600 may be synchronized (e.g., using semaphores, critical sections, and/or other thread synchronization mechanisms). Alternatively, the processing threads implementing each of methods 500 and 600 may be executed asynchronously with respect to each other. Various operations of each of methods 500 and 600 may be performed in a different order compared to the order shown in FIGS. 5 and 6. Some blocks may be performed concurrently with other blocks. Some blocks may be optional. Some or all of the blocks of each of methods 500 and 600 may be performed by fast prime number generation 104 module.

Method 500 may be implemented by processor 220 (or an arithmetic logic unit, an FPGA, and the like, or any processing logic, hardware or software or a combination thereof) performing a cryptographic operation, which may be set up to use a private key comprising two or more prime numbers, e.g., p and q. Method 500 may involve receiving an encrypted message c (ciphertext) from sending device 110. Prime numbers may be generated when the cryptographic application is set up and/or at regular time intervals, when the previous key has become compromised as a result of a power-analysis attack, a security breach, and so on. In some implementations, the private key may include three or more prime numbers.

The processing device implementing method 500 may initiate generation of a new set of prime numbers as part of a new cryptographic key. At block 510, the processing device may determine one or more polynomial functions that have no roots modulo each of a predefined set of prime numbers $\{P_i\}$, which may be a set of the lowest prime numbers up to a certain target prime number (e.g., the first N prime numbers excluding number 2). The processing device may select one or more parameter values (e.g., $-u$, $-u_1$, $-u_2$ . . . ) that are quadratic non-residues modulo each of the predefined set of prime numbers and use the selected parameter values to construct the one or more polynomial functions, e.g., $X^2 + u$. In some implementations, the one or more polynomial functions can be quadratic functions, e.g., $G(X) = s \cdot X^2 + t \cdot X + u$, whose discriminant $s \cdot X^2 + t \cdot X + u \neq 0$ is a quadratic nonresidue modulo each of the predefined set of prime numbers.

At block 520, method 500 may continue with selecting one or more input numbers $\{x_j\}$. In some implementations, the input numbers may be selected randomly within a predetermined interval. In some implementations, the input numbers may be selected using a respective (different for each j) output of a pseudorandom function. The respective j-th output of the pseudorandom function may determined in view of a seed number Seed and a respective hint value $Hint_j$. The seed number may be common to all instances j of selection of the input numbers $X_j$ whereas the hint numbers may be different for different j. In some implementations, both the hint number and the seed number change with every j when a new number $X_j$ is being selected.

At block 530, method 500 may continue with the processing device generating a candidate number Z by applying one or more instances of the one or more polynomial functions to the one or more input numbers. The candidate number Z may be generated by determining a product of multiple instances of the polynomial function, e.g., $Z = (X_1^2 + u) \cdot (X_2^2 + u)$ . . . . In some implementations, all instances j involve the same polynomial function $F(X_j, u)$ whereas in other implementations, some of the instances j may involve a different polynomial function $G(X_j, u)$ that is based on the same parameter value $-u$, or the same polynomial function $F(X_j, u_1)$, $F(X_j, u_2)$ . . . that is based on different values $-u_1$, $-u_2$ . . . , or different polynomial functions $G(X_j, u_2)$ . . . that are based on different values $-u_1$, $-u_2$ . . . , and so on. In some implementations, the product of the instances of the polynomial function is determined modulo a modulus number. The modulus number may be divisible by each of the predefined set of prime numbers $\{P_i\}$, e.g., the modulus number may be a product of the predefined set of prime numbers, $\Pi_i P_i$ (but may also include additional factors). The number of instances $j_{max}$ of polynomial function(s) may be arbitrary, e.g., in some implementations, the number of instances may be four, five, or more. In some implementations, the product of each of the one or more instances of the polynomial function(s) may be determined using Montgomery multiplication techniques.

At block 540, method 500 may continue with the processing device determining, using any known methods, that the candidate number Z is a prime number. Responsive to such a determination, the processing device may store, at block 550, the seed number Seed and the one or more hint values Hint, which resulted in generation of a successful candidate number Z. In some implementations, the determined prime numbers, e.g., p and q, may be used to generate the product $p \cdot q$ that is published (or transmitted) as part of the public key, whereas the values p and q may not be stored.

In some instances, the successful candidate number Z may not be the first candidate number generated using the set of input numbers $\{X_j\}$. For example, the set of initial input numbers $\{x_j\}$ may first be used to generate an initial (unsuccessful) candidate number using initial instances of the polynomial function(s) as described above, e.g., by multiplying the product of each of the one or more initial instances of the polynomial function(s). Accordingly, once it is determined that the initial candidate number is not a prime number, the product of the initial instances of the polynomial function(s) may be multiplied by one or more additional instances of the polynomial function (as applied to one or more additional input numbers $X_j$).

At block 560, method 500 may continue with the processing device using the determined prime number to decrypt an input into the cryptographic operation. For example, the processing device may receive the (ciphertext) input c and decrypt c to obtain message m. The decryption operation may be performed using the previously determined prime number(s), e.g., p and q, by computing (recovering) the determined prime number(s) using the stored seed number Seed and the one or more hint values $Hint_j$. In some implementations, computing the determined prime number(s) may be performed as described below in relation to FIG. 6.

Figure 6:
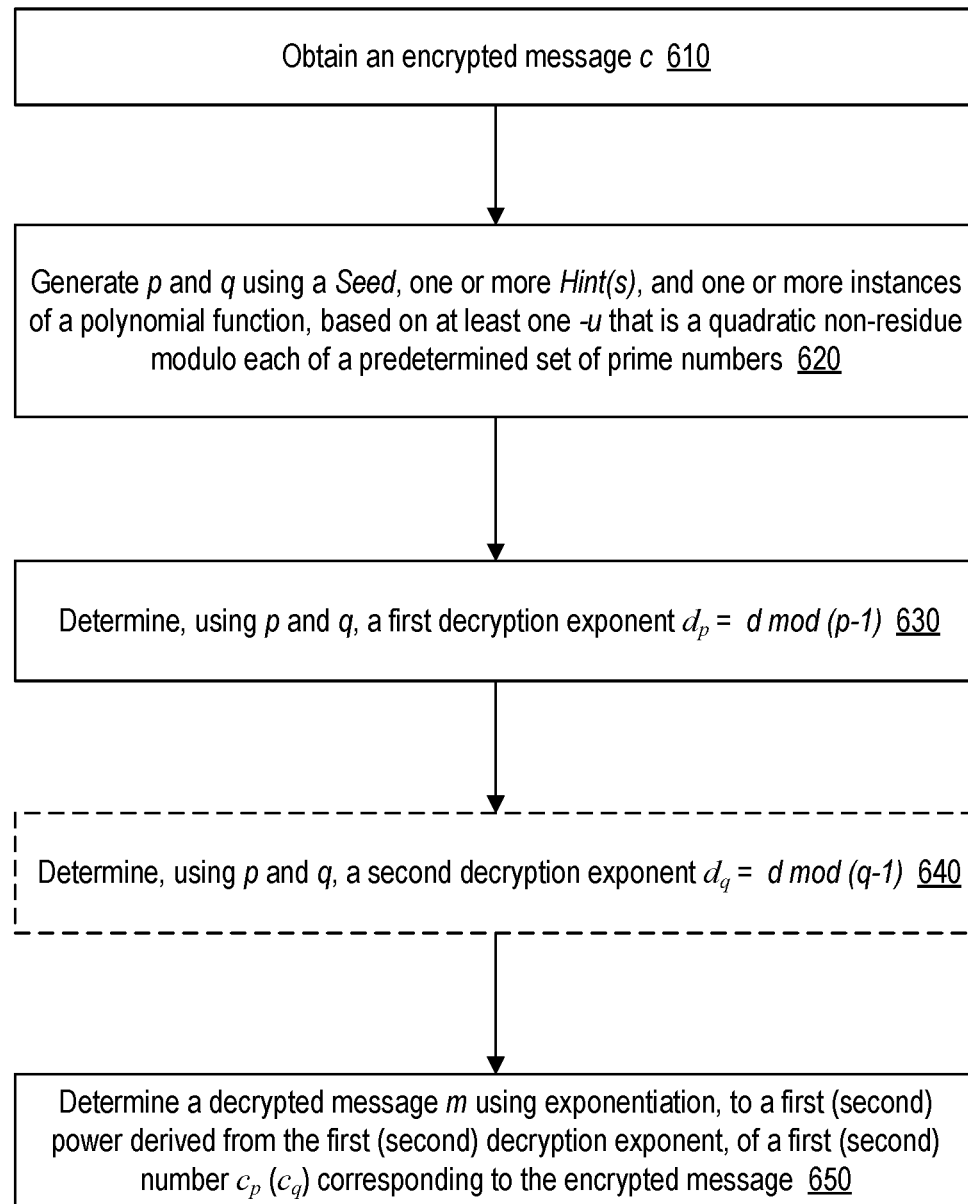
FIG. 6 depicts a flow diagram of an illustrative example of method of efficient storing and using generated prime numbers in cryptographic applications, in accordance with one or more aspects of the present disclosure.

FIG. 6 depicts a flow diagram of an illustrative example of method 600 of efficient storing and using generated prime numbers in cryptographic applications, in accordance with one or more aspects of the present disclosure. Some of the blocks of method 600 may be performed by fast prime number generation 104 module and some of the blocks of method 600 may be performed by inverse-free decryption 120 module of FIGS. 1-2. Method 600 may be implemented by processor 220 (or an arithmetic logic unit, an FPGA, and the like, or any processing logic, hardware or software or a combination thereof) performing a cryptographic operation based on a previously determined private key that uses two or more prime numbers, e.g., p and q. Method 600 may include obtaining, at block 610, an encrypted message c (ciphertext), e.g. from sending device 110.

At block 620, method 600 may continue with the processing device generating a first prime number, e.g., p, and a second prime number, e.g., q, using a seed number Seed, one or more hint numbers Hint, and one or more instances of a polynomial function. Each of the one or more instances of the polynomial function may include at least one parameter value, e.g., −u, that is a quadratic non-residues modulo each of a predefined set of prime numbers $\{P_i\}$. At block 630, the processing device may determine, using the first prime number p and the second prime number q, a first decryption exponent, e.g., $d_p$. The first decryption exponent may be a base decryption exponent d modulo a decremented first prime number, $d_p = d \mod(p-1)$. At block 640, the processing device may determine, using the first prime number p and the second prime number q, a second decryption exponent, e.g., $d_q$. The second decryption exponent may be the base decryption exponent d modulo a decremented second prime number, $d_q = d \mod(q-1)$. In some implementations, the first $d_p$ and second $d_q$ decryption exponents may be computed by first determining the base exponent d: $e \cdot d = 1 \mod \lambda(p,q)$, using the public exponent e. In some implementations, the first $d_p$ and second $d_q$ decryption exponents may be computed using Arazi's lemma and Hensel's lemma directly from p and q, bypassing the step of determining the base exponent d.

At block 650, the processing device performing method 600 may determine a decrypted message m, using exponentiation, to a first power derived from the first decryption exponent $d_p$, of a first number associated with the encrypted message. For example, the first number, $q \cdot \alpha_p$, $q^2 \cdot \alpha_p$, etc., associated with the encrypted message (with $\alpha_p = c_p \cdot q^{e-1}$, $\alpha_p = c_p \cdot q^{e-2}$, etc.) may be exponentiated to the to the first power, e.g., $d_p-1$, $d_p-2$, etc., as described in more detail above in conjunction with FIG. 3. Additionally, determining the decrypted message m may involve exponentiation, to a second power (e.g., $d_q-1$, $d_q-2$, etc.) derived from the second decryption exponent $d_q$, of a second number associated with the encrypted message. For example, the second number, $p \cdot \alpha_q$, $p^2 \cdot \alpha_q$, etc., associated with the encrypted message (with $\alpha_q = c_q \cdot p^{e-1}$, $\alpha_q = c_{q \cdot p}^{e-2}$, etc.) may be exponentiated to the second power, e. g., $d_q-1$, $d_q-2$, etc. Some or all operations (e.g., blinding operations that use random numbers) described in conjunction with FIG. 3 may also be performed as part of block 650.

Figure 7:
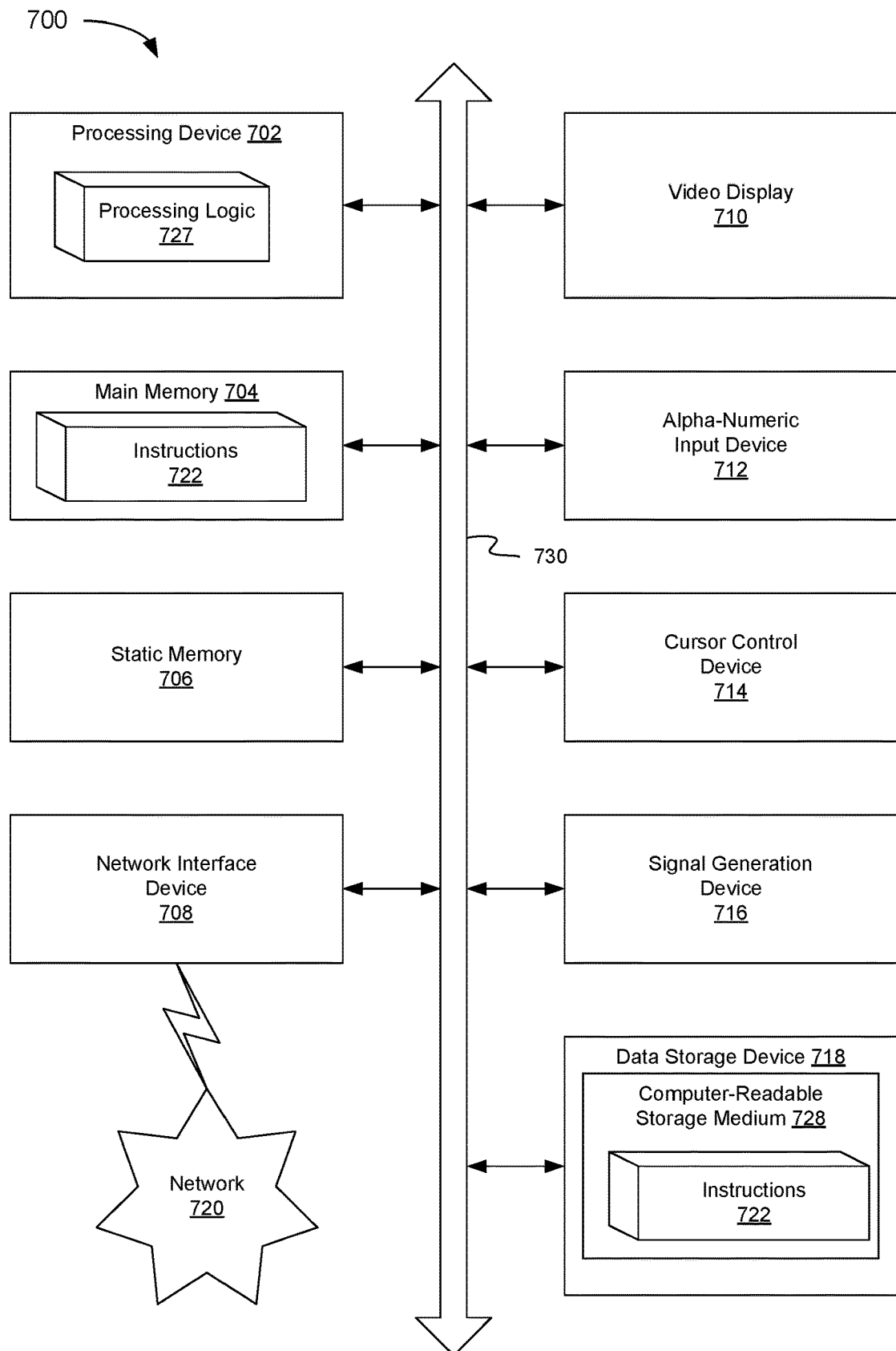
FIG. 7 depicts a block diagram of an example computer system operating in accordance with one or more aspects of the present disclosure.

FIG. 7 depicts a block diagram of an example computer system 700 operating in accordance with one or more aspects of the present disclosure. In various illustrative examples, computer system 700 may represent the computer device 202, illustrated in FIG. 2.

Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), which may include processing logic 727, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 300 of optimization of decryption operations by avoiding computations of inverse values, method 500 of generating and using prime numbers in cryptographic applications, and method 600 of efficient storing and using generated prime numbers in cryptographic applications.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 400 of protecting cryptographic operations by intermediate randomization.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a cryptographic operation based on a private key comprising a first prime number and a second prime number, the method comprising:
    obtaining, by a processing device, a first intermediate value based on a number corresponding to an encrypted message and a first number related to the first prime number, wherein obtaining the first intermediate value comprises:
        performing exponentiation to a first power that is determined in view of an encryption exponent for the cryptographic operation, and
        multiplying the number corresponding to the encrypted message by at least one of (i) the first prime number or (ii) the first power of the first number related to the first prime number;
    obtaining, by the processing device, a second intermediate value by computing a second power of a third intermediate value, wherein the second power is determined in view of a first decryption exponent and the third intermediate value is determined in view of the first prime number; and
    determining, by the processing device, a decrypted message using the first intermediate value and the second intermediate value.

2. The method of claim 1, wherein obtaining the first intermediate value comprises multiplying the number corresponding to the encrypted message by the first power of the first number related to the first prime number.

3. The method of claim 1, wherein determining the decrypted message comprises:
    determining a first combined value by multiplying the second intermediate value by the first intermediate value or by a third power of the first intermediate value.

4. The method of claim 3, further comprising:
obtaining, by the processing device, a fourth intermediate value based on the number corresponding to the encrypted message and a second number related to the second prime number, wherein obtaining the fourth intermediate value comprises performing exponentiation to the first power;
obtaining, by the processing device, a fifth intermediate value by computing a fifth power of a sixth intermediate value, wherein the fifth power is determined in view of a second decryption exponent and the sixth intermediate value is determined in view of the second prime number;
determining, by the processing device, a second combined value by multiplying the fifth intermediate value by the fourth intermediate value or by the third power of the fourth intermediate value; and
determining, by the processing device, the decrypted message using the first combined value and the second combined value.

5. The method of claim 3, further comprising:
multiplying the first combined value by the first prime number or by a fourth power of the first prime number.

6. The method of claim 1, wherein the third intermediate value is determined in further view of the first intermediate value.

7. The method of claim 1, wherein the first power is the encryption exponent reduced by one and the second power is the first decryption exponent reduced by two.

8. The method of claim 1, wherein the first power is the encryption exponent reduced by two and the second power is the first decryption exponent reduced by one.

9. The method of claim 1, wherein obtaining the first intermediate value comprises exponentiating, to the first power, a product of the number corresponding to the encrypted message and the first number related to the first prime number.

10. The method of claim 1, wherein the second power is equal to a decremented difference of the first prime number and the first decryption exponent, and wherein the third intermediate value comprises a product of the first prime number and the first number related to the first prime number.

11. The method of claim 1, wherein the first number related to the first prime number is obtained by multiplying the first prime number by a random number, and wherein the third intermediate value is determined in further view of the random number.

12. The method of claim 11, wherein determining the decrypted message comprises:
determining a first combined value by multiplying the second intermediate value by the first intermediate value or by a third power of the first intermediate value; and
multiplying a number based on the first combined value by the random number or by a fourth power of the random number.

13. A system to perform a cryptographic operation based on a private key comprising a first prime number and a second prime number, the system comprising:
a memory device; and
a processing device communicatively coupled to the memory device, the processing device to:
obtain a first intermediate value based on a number corresponding to an encrypted message and a first number related to the first prime number, wherein to obtain the first intermediate value the processing device is to:
perform exponentiation to a first power that is determined in view of an encryption exponent for the cryptographic operation, and
multiply the number corresponding to the encrypted message by at least one of (i) the first prime number or (ii) the first power of the first number related to the first prime number;
obtain a second intermediate value by computing a second power of a third intermediate value, wherein the second power is determined in view of a first decryption exponent and the third intermediate value is determined in view of the first prime number; and
determine a decrypted message using the first intermediate value and the second intermediate value.

14. The system of claim 13, wherein to obtain the first intermediate value the processing device it to multiply the number corresponding to the encrypted message by the first power of the first number related to the first prime number.

15. The system of claim 13, wherein to determine the decrypted message the processing device it to:
determine a first combined value by multiplying the second intermediate value by the first intermediate value or by a third power of the first intermediate value.

16. The system of claim 13, wherein to obtain the first intermediate value the processing device is to exponentiate, to the first power, a product of the number corresponding to the encrypted message and the first number related to the first prime number.

17. A non-transitory computer-readable medium storing instructions thereon, wherein the instructions, when executed by a processing device performing a cryptographic operation based on a private key comprising a first prime number and a second prime number, cause the processing device to:
obtain a first intermediate value based on a number corresponding to an encrypted message and a first number related to the first prime number, wherein to obtain the first intermediate value the instructions are to cause the processing device to:
perform exponentiation to a first power that is determined in view of an encryption exponent for the cryptographic operation, and
multiply the number corresponding to the encrypted message by at least one of (i) the first prime number or (ii) the first power of the first number related to the first prime number;
obtain a second intermediate value by computing a second power of a third intermediate value, wherein the second power is determined in view of a first decryption exponent and the third intermediate value is determined in view of the first prime number; and
determine a decrypted message using the first intermediate value and the second intermediate value.

* * * * *